United States Patent
Dankbaar

(10) Patent No.: US 7,669,464 B2
(45) Date of Patent: Mar. 2, 2010

(54) ARRANGEMENT FOR READING OFF THE POSITION OF THE GEAR LEVER IN A VEHICLE

(75) Inventor: Frank Dankbaar, Jonkoping (SE)

(73) Assignee: Kongsberg Automotive AB, Mullsjo (SE)

( * ) Notice: Subject to any disclaimer, the term of this patent is extended or adjusted under 35 U.S.C. 154(b) by 95 days.

(21) Appl. No.: 11/817,920

(22) PCT Filed: Mar. 3, 2006

(86) PCT No.: PCT/SE2006/000279

§ 371 (c)(1),
(2), (4) Date: Sep. 6, 2007

(87) PCT Pub. No.: WO2006/096114

PCT Pub. Date: Sep. 14, 2006

(65) Prior Publication Data

US 2008/0115571 A1    May 22, 2008

Related U.S. Application Data

(60) Provisional application No. 60/594,054, filed on Mar. 8, 2005.

(30) Foreign Application Priority Data

Mar. 8, 2005    (SE)    .................................... 0500521

(51) Int. Cl.
*G01M 13/02*    (2006.01)
(52) U.S. Cl. .................................................. 73/115.03
(58) Field of Classification Search ............... 73/115.01, 73/115.02, 115.03, 115.04
See application file for complete search history.

(56) References Cited

U.S. PATENT DOCUMENTS

| | | | | |
|---|---|---|---|---|
| 4,598,374 A * | 7/1986 | Klatt | ............................ | 701/60 |
| 4,660,430 A * | 4/1987 | Bortfeld et al. | ............... | 74/335 |
| 5,453,732 A * | 9/1995 | Takano | ....................... | 340/456 |
| 5,852,953 A * | 12/1998 | Ersoy | ....................... | 74/473.12 |
| 6,155,128 A | 12/2000 | Ersoy et al. | | |
| 7,203,587 B2 * | 4/2007 | Tamaru et al. | ................. | 701/64 |
| 2004/0035237 A1 * | 2/2004 | Matsui et al. | ............. | 74/473.12 |
| 2004/0211281 A1 | 10/2004 | Ersoy | | |
| 2005/0126326 A1 * | 6/2005 | Onodera | ................... | 74/473.18 |
| 2006/0201272 A1 * | 9/2006 | Syamoto et al. | ............. | 74/473.1 |

FOREIGN PATENT DOCUMENTS

EP    1076192    2/2001

* cited by examiner

*Primary Examiner*—Eric S McCall
(74) *Attorney, Agent, or Firm*—Edwards Angell Palmer & Dodge LLP; Steven M. Jensen

(57) ABSTRACT

The invention relates to an arrangement for reading off the position of the gear lever in a gear selector in a vehicle, in which a sensor arrangement includes a first sensor component and a plurality of second sensor components that can interact with the first sensor component to detect the position of the first sensor component. The first sensor component is arranged to move with the gear lever to read off the position of the first sensor component in relation to the plurality of second sensor components, where the first sensor component can cover at least two of the second sensor components. Further, a detected position of the first sensor component can be relayed to a control device, which is configured to evaluate the presence of faults in the device.

22 Claims, 10 Drawing Sheets

ARRANGEMENT FOR READING OFF THE POSITION OF THE GEAR LEVER IN A VEHICLE

TECHNICAL FIELD

The present invention relates to an arrangement for reading off the position of the gear lever in a gear selector in a vehicle. The arrangement comprises a sensor arrangement with a first sensor component and a plurality of second sensor components that can be activated by the first sensor component. The first sensor component is arranged to move with the gear lever when this is moved, and the arrangement comprises, in addition, reading off means for reading off the position of the first sensor component in relation to the said plurality of second sensor components.

The second sensor components are arranged a certain maximum distance apart in a first direction in which the first sensor component moves when the gear lever is moved, and the first sensor component has a certain length in the said direction.

BACKGROUND ART

A technology that is becoming increasingly common in gearboxes in vehicles is so-called "shift by wire" technology, in other words a system where there is no mechanical connection between the gear lever and the gearbox. Instead, such systems have an electronic connection between a gear selector, arranged in association with the gear lever, and the gearbox. The position of the gear lever in the gear selector is read off by a sensor arrangement that sends information about the position of the gear lever to the gearbox, whereupon a required gear position is assumed.

In systems with "shift by wire", it is of great interest to be able to give the system a high level of reliability and the ability to indicate faults when faults arise, while at the same time the system must be able to operate with reduced performance in the event of a fault in one or more components in the system.

DISCLOSURE OF INVENTION

There is thus a need for an arrangement in a gear selector that can provide an increased level of reliability, particularly in gear selectors with an electronic connection between the gear selector and the gear box, so-called "shift by wire" technology.

This need is met by the present invention in that it provides an arrangement for reading off the position of the gear lever in a gear selector in a vehicle. The arrangement comprises a sensor arrangement with a first sensor component and a plurality of second sensor components that can interact with the first sensor component to detect the position of the first sensor component.

The first sensor component is arranged to move with the gear lever when the gear lever is moved, and there are reading off means in the arrangement for reading off the position of the first sensor component in relation to the said plurality of second sensor components.

The second sensor components are arranged a certain maximum distance d apart in a first direction in which the first sensor component moves when the gear lever is moved, and the first sensor component has a particular length l in the said direction. The length l of the first sensor component in the said direction is such that, when it moves, it can cover parts of at most two of the said second sensor components.

In this way, this dimensioning and positioning of the sensor components provide an increased level of reliability in a gear selector with "shift by wire" technology, as will be apparent from the following description.

In a preferred embodiment, the reading-off means are arranged in association with the second sensor components.

The first sensor component can be passive and the second sensor components active, in other words the second sensor components are activated by the first sensor component, or, conversely, the first sensor component can be active and the second sensor components passive, in which case the second sensor components activate the first sensor component. In the latter case, the first and second sensor components suitably operate using optics.

The first sensor component can be a magnet, and the second sensor components can, in this case, be sensors that are sensitive to magnetism. Alternatively, the first sensor component can be sensitive to magnetism and the second sensor components can be magnets.

In other embodiments, the first sensor component and the second sensor components can be electrically conductive, so that contact between the first sensor component and at least one of the second sensor components gives rise to a closed current path. Alternatively, the first sensor component and the second sensor components can interact by optical means.

BRIEF DESCRIPTION OF DRAWINGS

The invention will be described in greater detail in the following description, with reference to the attached drawings, in which.

MODES FOR CARRYING OUT THE INVENTION

Figure 1:
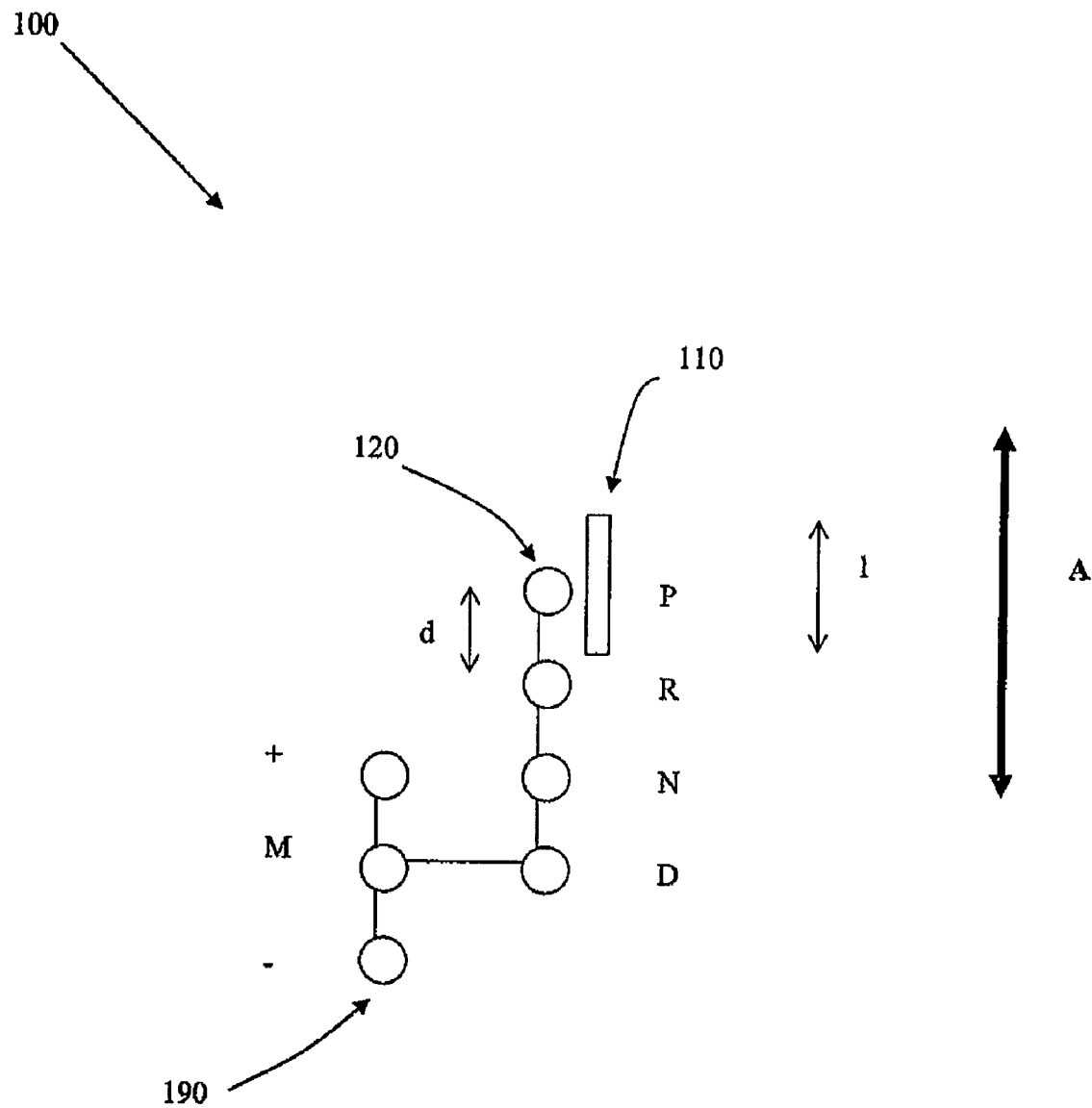
FIGS. 1-3 show a gear change procedure.

FIG. 1 shows a schematic cross section of an arrangement 100 according to the invention, viewed from above. The arrangement 100 comprises a first sensor component 110, arranged on a gear lever (not shown) in such a way that the first sensor component 110 moves with the movements of the gear lever in at least a first direction, which is indicated by the double arrow A.

The arrangement 100 also comprises a number of second sensor components 120, 190 that interact with the first sensor component 110 in such a way that the positions of the gear lever and possibly also its movements can be detected. The second sensor components suitably correspond in number and positioning to the gear positions that the gear lever can assume. FIG. 1 shows the following as examples of such positions: P, R, N, D, and the manual position "M" with the positions "+" and "−".

The first sensor component 110 and the second sensor components 120, 190 can interact with each other in accordance with a large number of known principles. In a preferred embodiment, the first sensor component 110 is a magnet and the second sensor components 120, 190 are sensors that are sensitive to magnetism.

Other possible sensor principles that can be mentioned include the first sensor component and the second sensor components being electrically conductive, so that contact between the first sensor component and at least one of the second sensor components gives rise to a closed current path. In addition, the first sensor component and the second sensor components can interact by optical means. It is common to all the principles that the first sensor component and the second sensor components are arranged in such a way that the first sensor component activates the second sensor components, or vice versa. In the latter case, where the first sensor component is activated by the second sensor components, the sensor principle is suitably optical.

Irrespective of which sensor principle is selected, the arrangement 100 also comprises means for reading off the position of the first sensor component in relation to the said second sensor components. The position that has been read off is sent to a control device, suitably a microprocessor, that ensures that the gearbox assumes the position that is indicated by the position of the gear lever. The reading-off means can be comprised in the second sensor components, but can also be external means that are connected to the second sensor components. As an alternative, the reading-off means can, of course, be arranged in association with the first sensor component.

As mentioned, and as shown in FIG. 1, the second sensor components are arranged along a first direction A, shown by a double arrow in FIG. 1, in which the first sensor component will move when the gear lever is moved, which applies both for the "path" P-R-N-D and for the "path" +M-.

The second sensor components 120, 190 are arranged in the direction A with a maximum distance of d between adjacent second sensor components. As shown in FIG. 1, in the embodiment illustrated, there are two "paths" in which the gear lever can move, a first path with the automatic gear positions P-R-N-D, and a second path called M with the positions +, M, −. In the embodiment illustrated, when the gear lever is moved between the two paths, it is moved in a direction that is essentially at right angles to the direction A. In the example, the first and second paths are thus essentially parallel.

In addition, the first sensor component 110 has a particular length l in the said direction A, as shown in FIG. 1. The length l of the first sensor component in the said direction is such that, when it moves in the direction A, it can cover parts of at least two of the said second sensor components.

During the said movement, the first sensor component covers two adjacent second sensor components for a short part of its movement.

As mentioned in the introduction, it is of great importance to be able to detect and locate a fault in a gear selector of this type, in other words a gear selector that utilizes the "shift by wire" technology.

Three main types of fault can be distinguished:

Faults in the control device associated with the gear selector

Faults in the "passive" part of the sensor (the magnet or the like)

Faults in the "active" part of the sensor (the sensors that are sensitive to magnetism, or the like)

The present invention is aimed primarily at being able to detect and accordingly remedy the latter type of fault, in other words faults in the active part of the sensor, namely the second sensor components in the example illustrated, in the form of sensors that are sensitive to magnetism.

These faults can be detected by means of the first and second sensor components that have been described, advantageously utilizing a number of rules that are made possible as a result of the described embodiment of the sensor components. Before these rules are described, an example of a possible gear-change procedure will first be described with reference to FIGS. 1-3:

FIG. 1 shows the gear lever in a position that corresponds to the gear position "P". The first sensor component 110 covers or activates the particular one of the second sensor components 120 that corresponds to this gear position. This is detected by the reading-off means in the way described above and corresponding information is sent to the said control device so that the required gear position can be assumed by the gearbox.

Figure 2:
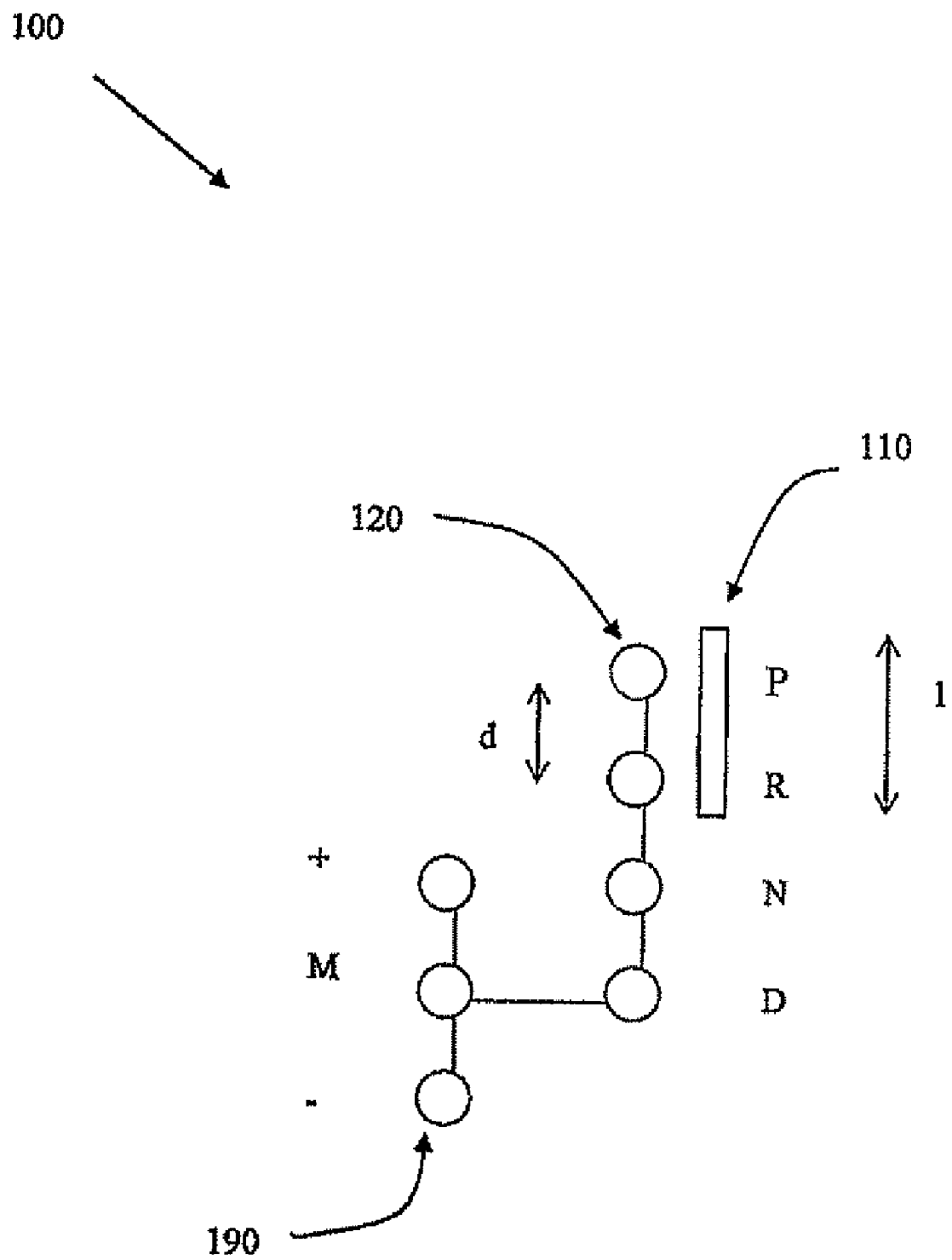

In FIG. 2, the gear lever has started to be moved from the position "P" to the adjacent position "R". During the movement of the gear lever from the position "P" to the position "R", the first sensor component 110 will briefly "cover" or activate both the second sensor component that corresponds to the position "P" and the second sensor component that corresponds to the position "R", as shown in FIG. 2. This is detected by the reading-off means in the way described above, and corresponding information is sent to the said control device.

Figure 3:
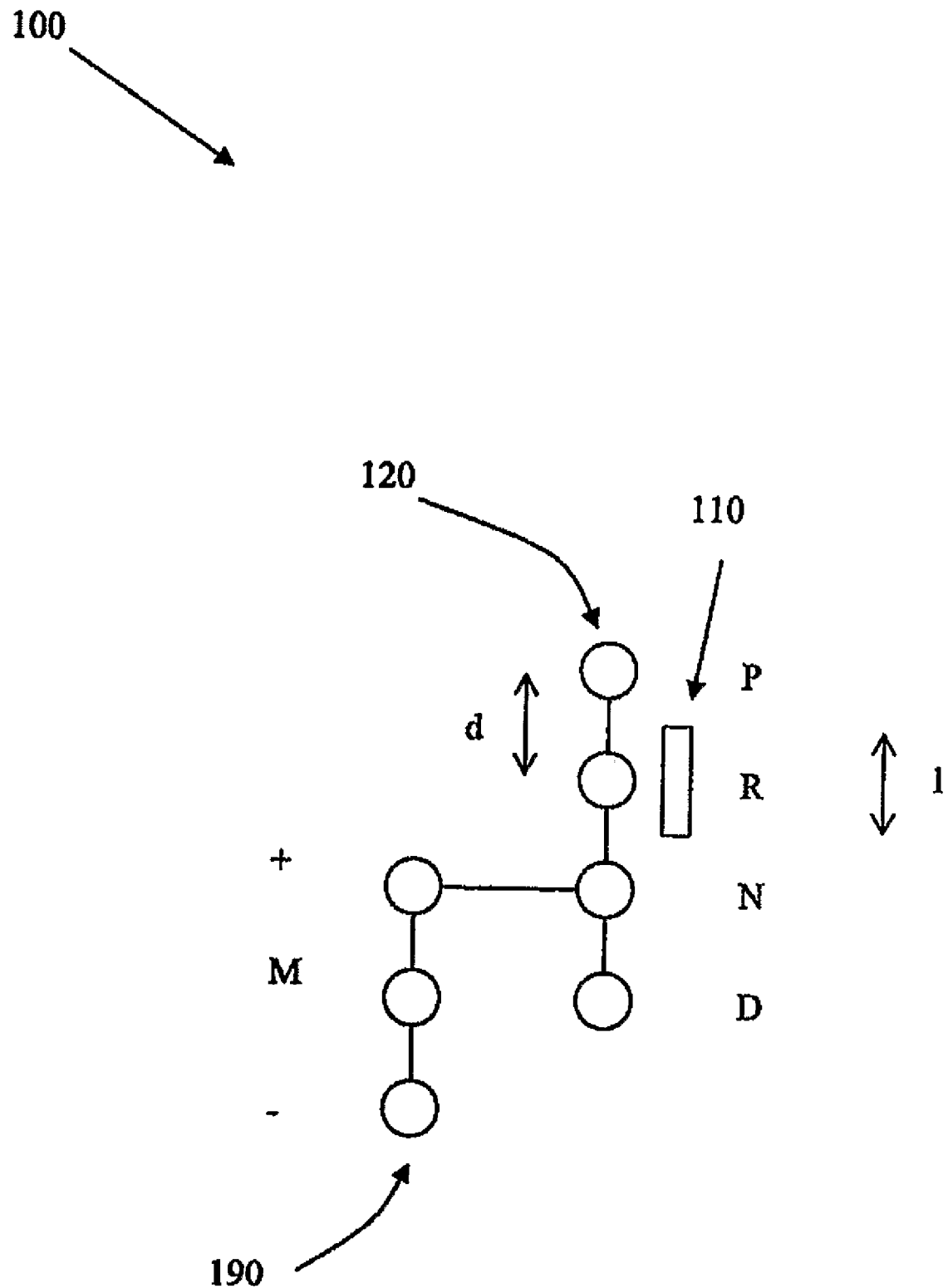

In FIG. 3, the gear lever has assumed the position that corresponds to the gear position "R". In this position, the first sensor component 110 "covers" or activates the second sensor component that corresponds to the position "R". This is detected by the reading-off means in the way described above and corresponding information is sent to the said control device, so that the gear position "R" can be assumed by the gearbox.

The positioning and dimensioning of the first sensor component 110 and the second sensor components 120, 190 can be used to detect and locate faults that have arisen in the arrangement, utilizing the following five rules that are applied by the control device:

At least one of the second sensor components must always be activated.

A maximum of two of the second sensor components can be activated at the same time.

Only two adjacent second sensor components can be activated at the same time.

Two signal edges must always be detected at the transition between two adjacent gear positions.

The sequence of second sensor components that are activated must always match the mechanical positioning of the second sensor components.

Figure 4:
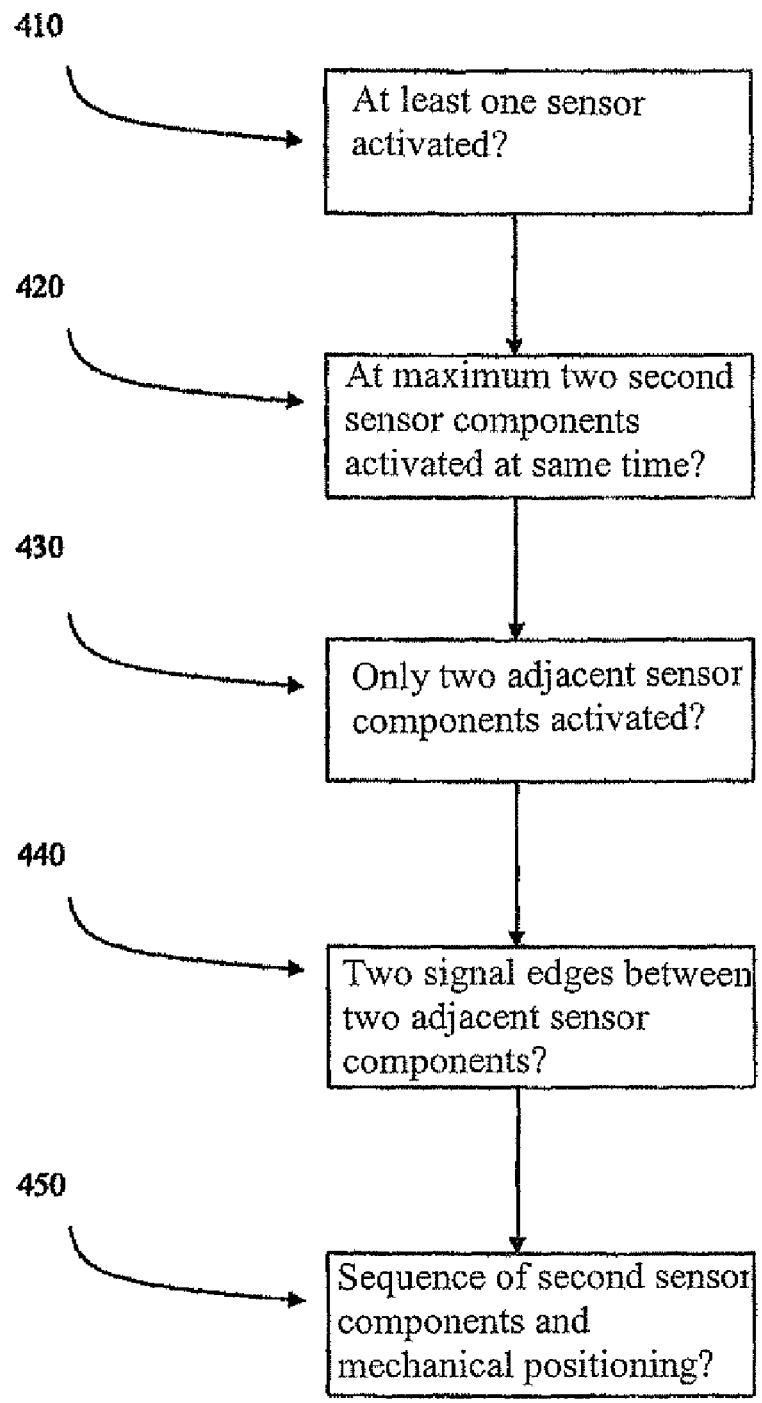
FIG. 4 shows a flow chart for fault detection.

These rules are illustrated in FIG. 4 as a flow chart. It should, however, be emphasized that the rules do not need to be applied sequentially, but that a "breach" of any of the rules can be used by the control unit as an indication that there is a fault in the arrangement. In addition, it should be pointed out that the rules can also be used individually, or as a group in combinations with fewer than five rules. The flow chart in FIG. 4 is thus only to be regarded as an example of checking all five rules in a group that comprises all the rules, for example, as represented by reference numbers 410, 420, 430, 440, and 450 in the flow chart of FIG. 4. The order that is shown in FIG. 4 can also be varied in almost any way.

It is described below how the control device reacts in the event of a "breach" of the different rules.

At least one of the second sensor components must always be activated.

If the control unit detects that none of the second sensor components 120, 190 are activated (during a predetermined filtering period), an error message is sent to the transmission electronics in the vehicle, in the following called the Transmission Control Unit, TCU.

Depending upon the situation, for example the most recent gear position, selected gear position, engine speed, clutch position, etc, the TCU can then carry out the safest measures in response to the reported fault.

A maximum of two of the second sensor components can be activated at the same time.

If more than two of the second sensor components are active (during a predetermined filtering period), the control unit informs the TCU of this so that measures can be taken.

Only two adjacent second sensor components can be activated at the same time.

If two of the second sensor components are activated at the same time and these are not adjacent to each other, the control unit informs the TCU of this so that measures can be taken.

Two signal edges must always be detected at the transition between two adjacent gear positions.

By the term "signal edge" is meant the transition that arises when the first sensor component activates one of the second sensor components, or when the first sensor component leaves, in other words "deactivates" one of the second sensor components. It will be recognized that two signal edges must arise at the transition between two adjacent gear positions. If the control unit detects that this does not occur, it informs the TCU of this so that measures can be taken.

The sequence of second sensor components that are activated must always match the mechanical positioning of the second sensor components:

If the second sensor components are activated in an order that does not match their mechanical positioning, the control unit informs the TCU of this so that measures can be taken.

An example will now be described that shows how the invention can be used to detect and locate a fault in a gear selector, with reference to FIGS. 5a-5e. In the example, it is assumed that the second sensor component that corresponds to the position "N" of the gear lever is not working, but it should be recognized that the example is equally applicable to one or more other second sensor components. The fact that the sensor "N" is not working is shown in the drawings by it being marked with a cross.

Figure 5A:
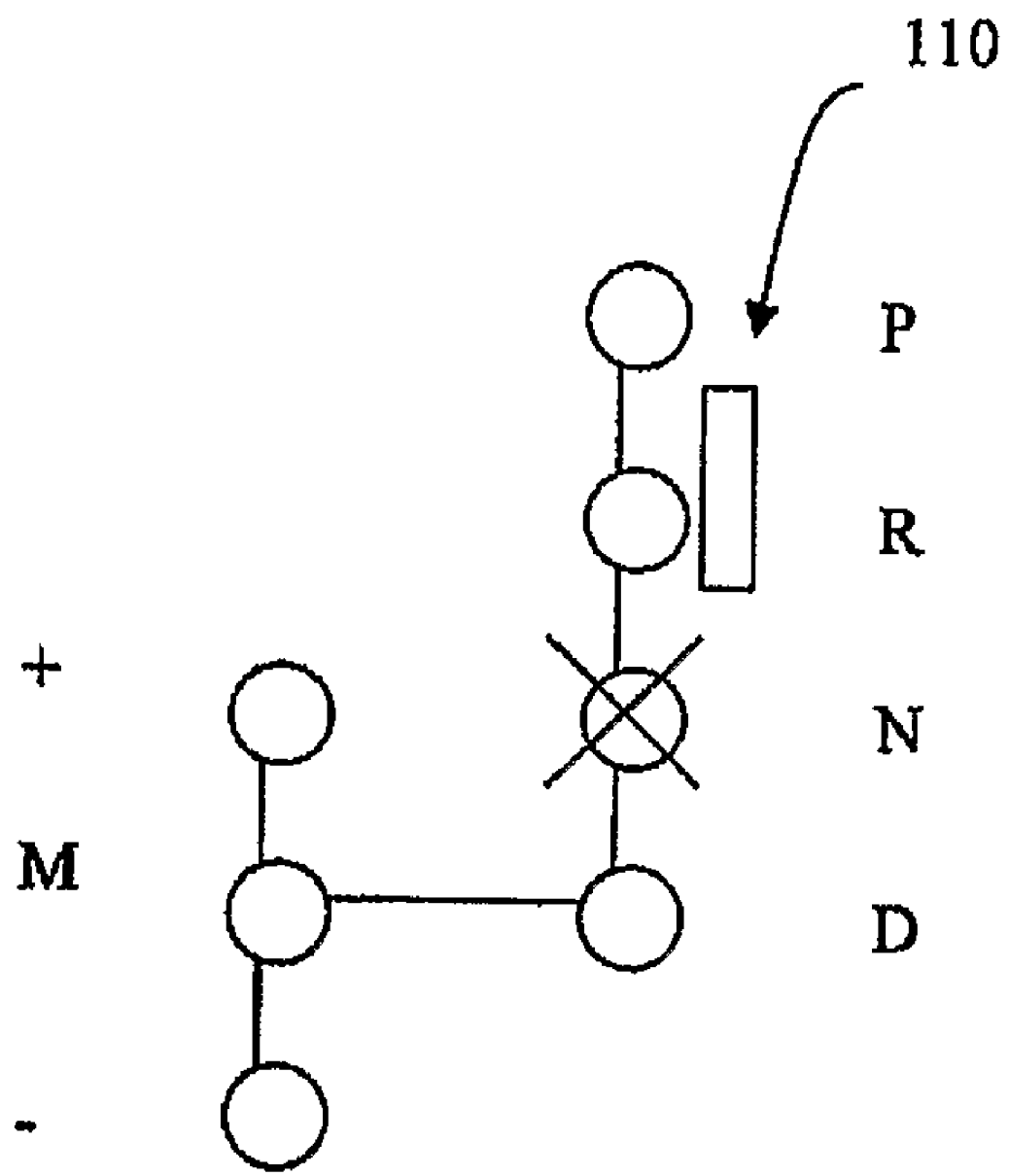
FIGS. 5*a*-5*e* show fault-finding by means of the invention.
Figure 5B:
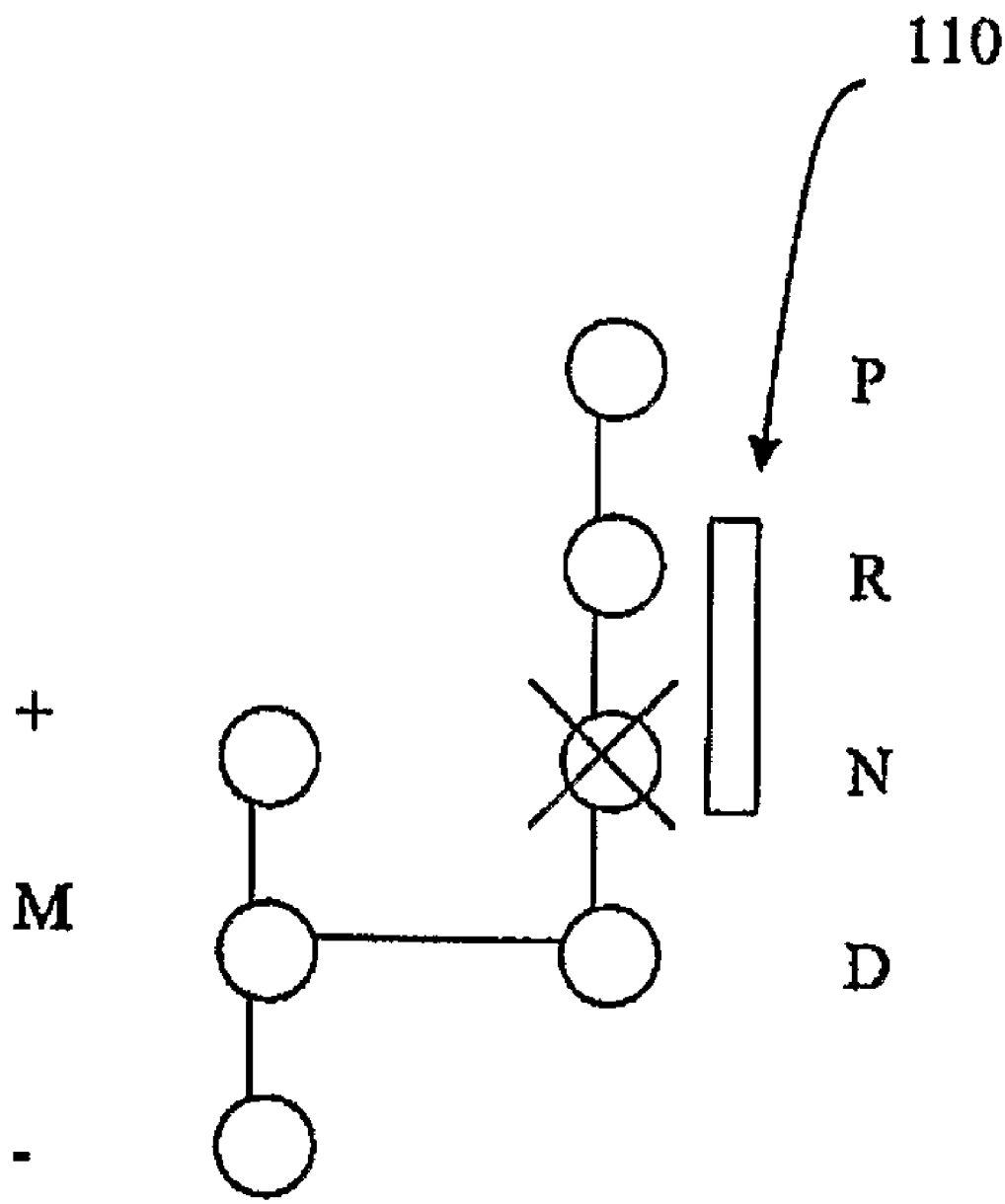

In FIG. 5a, the gear lever and hence the first sensor component 110 are in the position "R", which means that the fault in the sensor "N" cannot be detected. In FIG. 5b, the gear lever has started to be moved towards the position "N". The detection of the sensor component 110 in the position "N", which should have occurred with a working second sensor component in the position "N", does not occur, but the TCU does not recognize that any of the five rules listed above have been broken, as detection of the sensor component 110 is still carried out in the position "R".

Figure 5C:
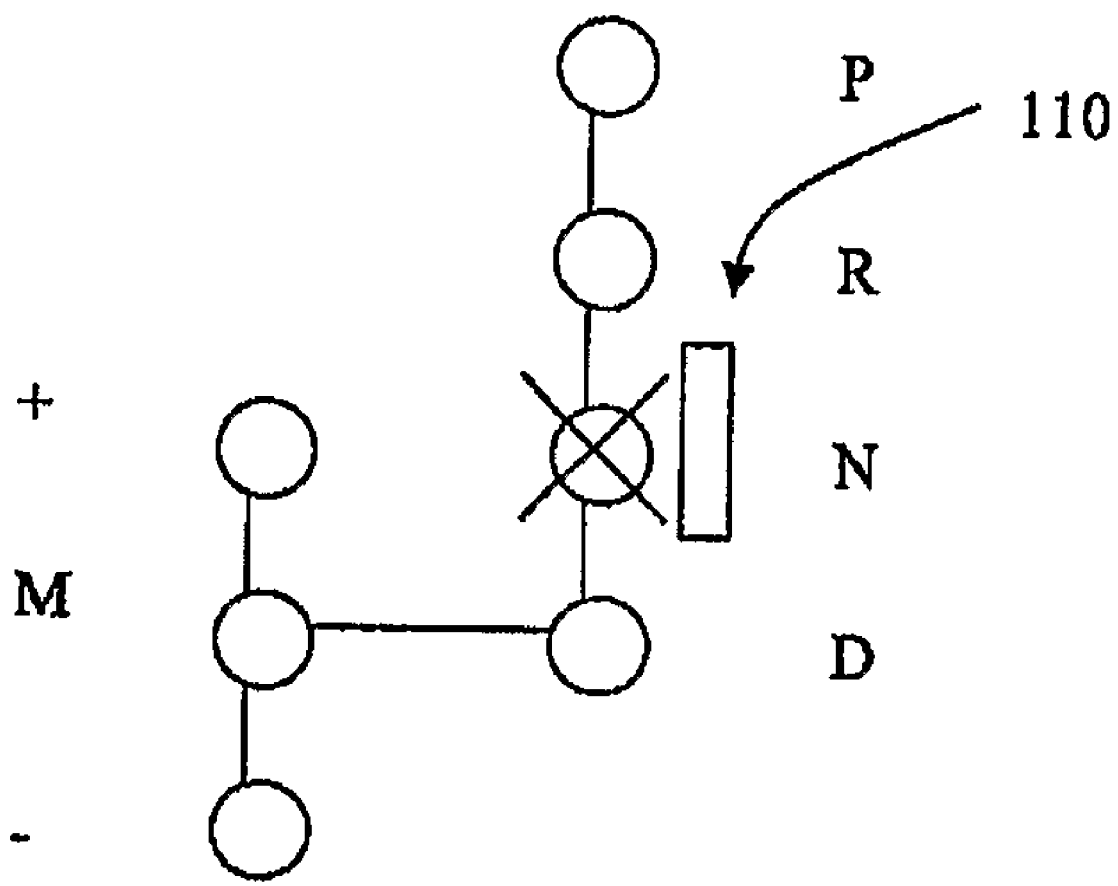

In FIG. 5c, the gear lever and hence the sensor component 110 have been moved completely to the position "N". A fault is reported to the TCU, as the rule that at least one of the second sensor components must always be activated has been broken. It is not possible in this position to know whether it is the detection of the positions P, R or N that is not working. The TCU commands the gearbox to assume the position "N", as this is a safe position.

Figure 5D:
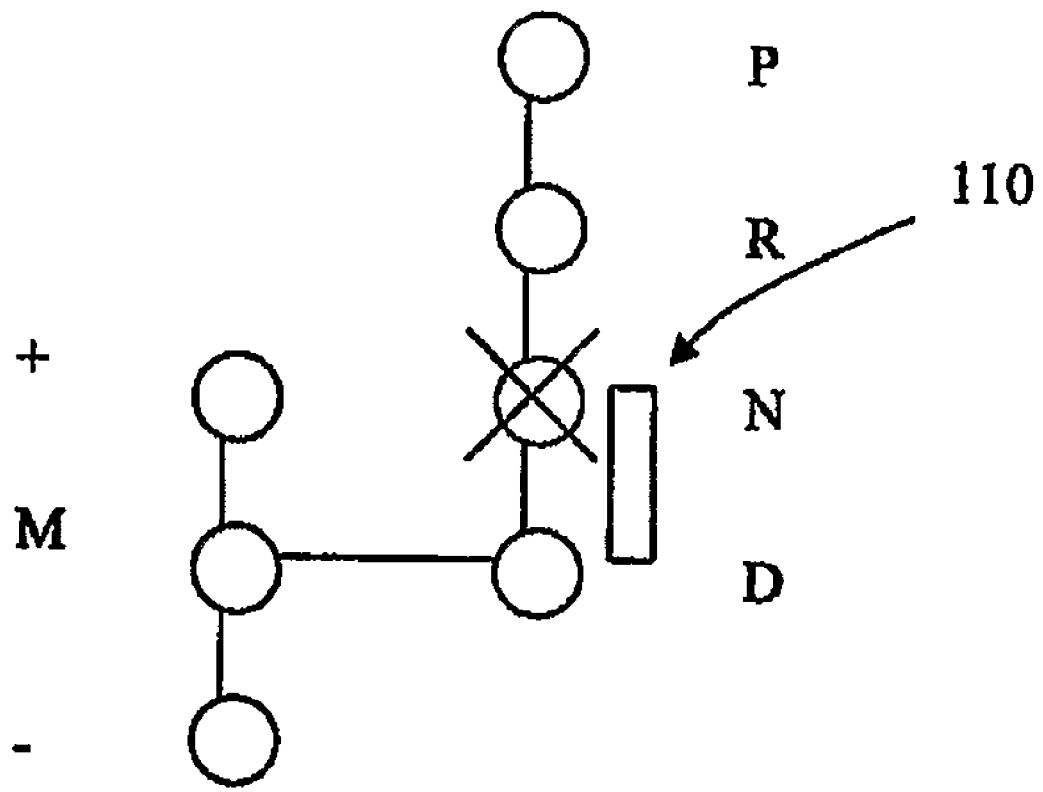
Figure 5E:
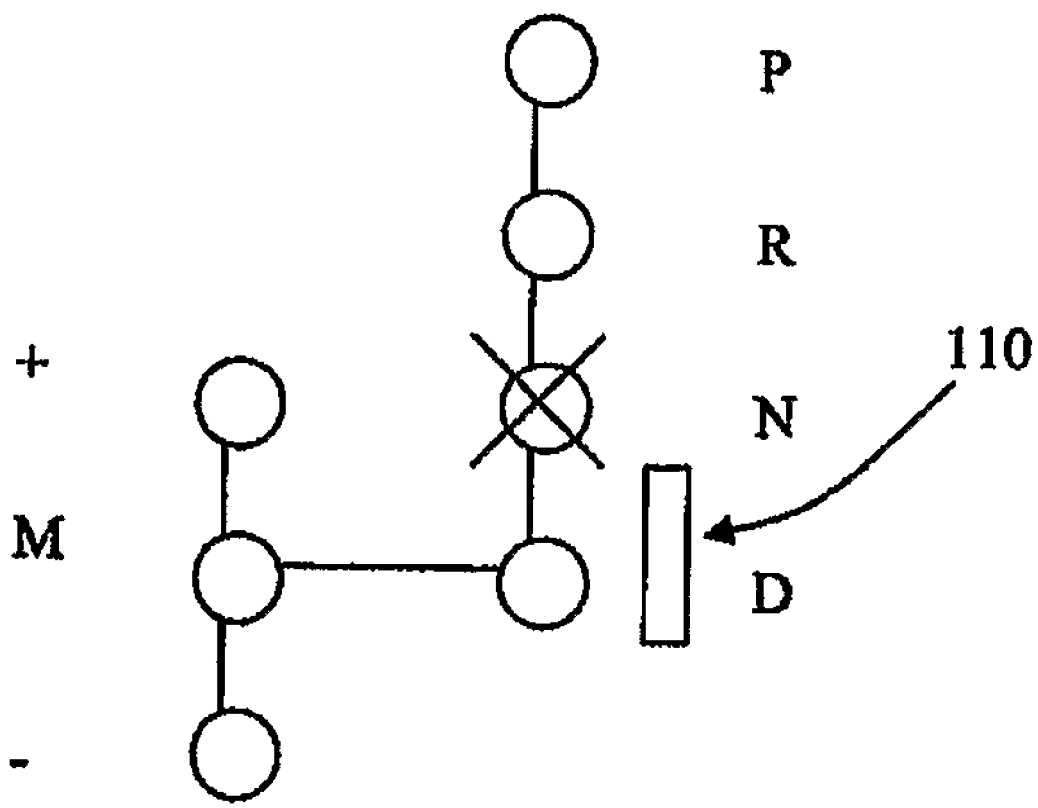

In FIG. 5d, the gear lever is moved towards the position "D". The TCU can now draw the conclusion that it is the detection of the position "N" that is not working. In FIG. 5e, the gear lever is completely in the position "D". In order to achieve safe functionality, the TCU will still command the gearbox to assume the position "N" until a valid sequence of positions is obtained, for example D-M-D. This and the other described measures that are taken by the TCU in the event of the detection of an error function are, of course, only examples and can be varied in a large number of ways.

FIGS. 6a-6e show how functionality can be achieved in a gearbox by means of the invention, even if one of the gear positions cannot be detected. The drawings show in turn which of the gear positions it is that cannot be detected, and it is described below how the functionality can still be obtained.

The gear position that cannot be detected is shown with grey shading. Although the functionality that is achieved in accordance with the description is somewhat reduced, it enables the vehicle to be driven until, for example, it can be repaired.

Figure 6A:
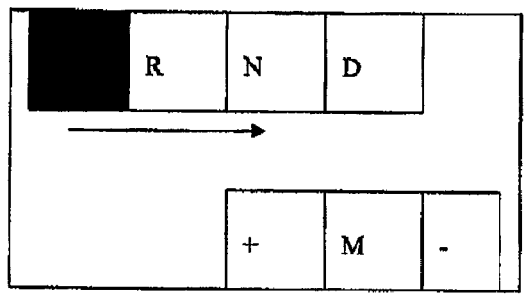
FIGS. 6*a*-6*e* show how functionality can be achieved in a gearbox by means of the invention in the event of a fault arising.

In FIG. 6a, it is the second sensor component in the position "P" that is not working. In order for a new gear position to be able to be assumed, the lever must be moved past the position "R" to the position "N", after which any position can be assumed, as the five rules that have been described above have then been observed.

It is worth noting that certain gear positions can be regarded as "safe positions", which means that they can be assumed even if the five rules have not been followed. Which these "safe positions" are, can of course vary between different designs, but, in a preferred embodiment, it is the positions "P" and "N" that have been defined as such positions.

Figure 6B:
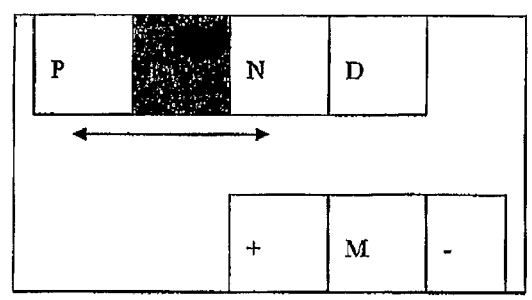

The definition of "safe positions" is of significance in the situation that is shown in FIG. 6b: in this situation it is the second sensor component in the position "R" that is not working. In spite of this, the TCU permits the gear positions that are on each side of "R" to be assumed, as these are the positions "P" and "N".

Figure 6C:
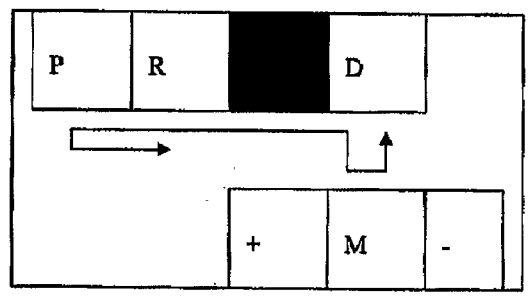

FIG. 6c shows that the detection of the position "N" does not work. In order for the rules for changing gear to be able to be observed, the gear lever must be moved either via R-P-R or D-M-D, as shown in FIG. 6c.

Figure 6D:
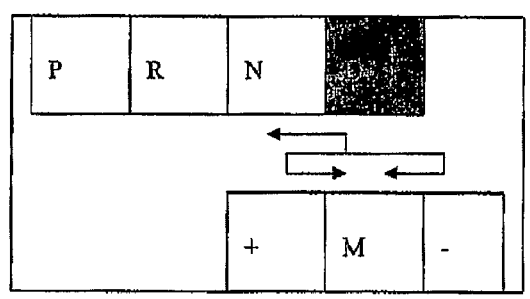

If the position "D" cannot be detected, as shown in FIG. 6d, the gear lever can be moved either directly to the position "N", as this is a "safe position", or via "M+M" or "M−M".

Figure 6E:
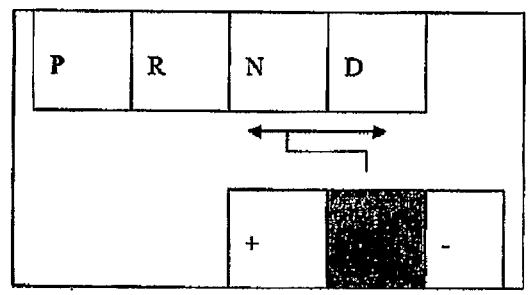

Finally, as shown in FIG. 6e, if the position "M" cannot be detected, the TCU does not allow a gear change until the gear lever has been moved in the sequence D-N-D, or alternatively the position "N" can be assumed directly via the sequence D-N. From the position "N", any gear position can thereafter be assumed.

Thus, by means of the invention, a fault in the detection of a gear position can result in reduced but still working functionality in a gearbox in a vehicle, which means that the vehicle can safely be driven home or be driven to be repaired.

The invention claimed is:

1. A device for detecting a position of a gear lever in a vehicle, comprising:
    a first sensor component operably connected with the gear lever;
    a plurality of second sensor components configured to interact with the first sensor component for detecting the position of the first sensor component; and
    the first sensor component configured to cover at least two of the second sensor components during movement of the first sensor component,
    wherein the detected position of the first sensor component is relayed to a control device, and the control device is configured to evaluate the presence of faults in the device.

2. The device of claim 1, wherein the first sensor component has a length greater than a distance between an adjacent two of the second sensor components such that the first sensor component is configured to cover the adjacent two second sensor components during movement of the first sensor component.

3. The device of claim 2, wherein the length of the first sensor component is less than a distance between three of the second sensor components arranged in a row.

4. The device of claim 2, wherein the second sensor components are each separated by approximately equal distances, and the length of the first sensor component does not exceed a distance between an adjacent three of the second sensor components.

5. The device of claim 1, wherein the first sensor component is a passive element, and the second sensor components are active elements.

6. The device of claim 1, wherein the first sensor component is an active element, and the second sensor components are passive elements.

7. The device of claim 1, wherein the first sensor component is a magnet, and the second sensor components are sensors sensitive to magnetism.

8. The device of claim 1, wherein the first sensor component and the second sensor components are electrically conductive, such that contact between the first sensor component and at least one of the second sensor components provides a closed current path.

9. The device of claim 1, wherein the first sensor component and the second sensor components are configured to interact optically.

10. The device of claim 1, wherein the control device designates that a fault has occurred if none of the second sensor components are activated by the first sensor component.

11. The device of claim 1, wherein the control device designates that a fault has occurred if more than two of the second sensor components are activated by the first sensor component at the same time.

12. The device of claim 1, wherein the control device designates that a fault has occurred if two nonadjacent second sensor components are activated by the first sensor component at the same time.

13. The device of claim 1, wherein the control device designates that a fault has occurred if two adjacent second sensor components are activated by the first sensor component without two signal edges having been detected.

14. The device of claim 1, wherein the control device designates that a fault has occurred if the second sensor components are activated in a sequence that does not match an order in which the second sensor components are arranged in the device.

15. The device of claim 1, wherein the gear lever is arranged in a gear selector of the vehicle.

16. The device of claim 1, wherein the device is arranged in a motor vehicle.

17. A device for detecting a position of a gear lever in a vehicle, comprising:
a first sensor component operably connected with the gear lever;
a plurality of second sensor components configured to interact with the first sensor component for detecting the position of the first sensor component; and
wherein the first sensor component has a length greater than a distance between an adjacent two of the second sensor components such that the first sensor component is configured to cover the adjacent two second sensor components during movement of the first sensor component, and
the detected position of the first sensor component is relayed to a control device, and the control device is configured to evaluate the presence of faults in the device.

18. The device of claim 17, wherein the length of the first sensor component is less than a distance between three of the second sensor components arranged in a row.

19. The device of claim 17, wherein the second sensor components are each separated by approximately equal distances, and the length of the first sensor component does not exceed a distance between an adjacent three of the second sensor components.

20. The device of claim 17, wherein the gear lever is arranged in a gear selector of the vehicle.

21. A method for detecting a position of a gear lever in a vehicle, comprising the steps of:
providing a first sensor component operably connected with the gear lever;
providing a plurality of second sensor components configured to interact with the first sensor component for detecting the position of the first sensor component;
moving the first sensor component such that the first sensor component covers at least two of the second sensor components;
detecting a position of the first sensor component;
relaying the detected position of the first sensor component to a control device; and
operating the control device to evaluate the presence of faults in the device.

22. The method of claim 21, wherein the gear lever is arranged in a gear selector of the vehicle.

* * * * *